US006856803B1

(12) United States Patent
Gross et al.

(10) Patent No.: US 6,856,803 B1
(45) Date of Patent: Feb. 15, 2005

(54) METHOD FOR MAINTAINING CANDIDATE HANDOFF LIST FOR AIRBORNE CELLULAR SYSTEM

(75) Inventors: Jonathan H. Gross, Gilbert, AZ (US); Thomas Peter Emmons, Jr., Mesa, AZ (US); Michael A. Tessler, Plano, TX (US)

(73) Assignee: Motorola, Inc., Schaumburg, IL (US)

( * ) Notice: Subject to any disclaimer, the term of this patent is extended or adjusted under 35 U.S.C. 154(b) by 476 days.

(21) Appl. No.: 09/605,085

(22) Filed: Jun. 26, 2000

(51) Int. Cl.⁷ ................................................. H04Q 7/20
(52) U.S. Cl. ..................... 455/431; 455/432.1; 455/436; 455/440; 370/331
(58) Field of Search .............................. 455/11.1, 12.1, 455/427, 432.1, 13.1, 436, 437, 438, 439, 440, 441, 492, 443, 444, 445, 517, 431, 432; 370/331

(56) References Cited

U.S. PATENT DOCUMENTS

| | | | |
|---|---|---|---|
| 2,598,064 A | | 5/1952 | Lindenblad |
| 2,626,348 A | | 1/1953 | Nobles |
| 2,627,021 A | | 1/1953 | Hansell et al. |
| 2,748,266 A | | 5/1956 | Boyd |
| 3,866,227 A | | 2/1975 | Ruvin |
| 4,670,899 A | * | 6/1987 | Brody et al. ............... 455/453 |
| 5,063,387 A | | 11/1991 | Mower |
| 5,067,172 A | | 11/1991 | Schloemer |
| 5,123,112 A | | 6/1992 | Choate |
| 5,187,805 A | | 2/1993 | Bertiger et al. |
| 5,455,964 A | | 10/1995 | Roos et al. |
| 5,479,482 A | | 12/1995 | Grimes |
| 5,509,051 A | * | 4/1996 | Barnett et al. ............. 455/443 |
| 5,530,909 A | | 6/1996 | Simon et al. |
| 5,548,292 A | | 8/1996 | Hirshfield et al. |
| 5,557,656 A | * | 9/1996 | Ray et al. ................. 455/431 |
| 5,559,865 A | | 9/1996 | Gilhousen |
| 5,574,968 A | | 11/1996 | Olds et al. |
| 5,619,211 A | | 4/1997 | Horkin et al. |

(List continued on next page.)

FOREIGN PATENT DOCUMENTS

| | | | |
|---|---|---|---|
| EP | 0 421 704 A2 | 10/1990 | |
| EP | 0 618 704 A1 | 11/1994 | |
| EP | 0803742 | * 4/1997 | ............. G01S/5/12 |

(List continued on next page.)

OTHER PUBLICATIONS

Airborne Relay Communication System—System Demo—public handout at May 1, 1998 demonstration, 36 pages.*
"Airborne Relay Communication System"—System Demonstration—public handout at public demonstration, May 1, 1998, 36 pages.
"Concept Overview", Angel Technologies Corporation Web Page Printout, (www.angelcorp.com), Mar. 1998, 7 pages.

(List continued on next page.)

*Primary Examiner*—William Trost
*Assistant Examiner*—Stephen D'Agosta
(74) *Attorney, Agent, or Firm*—Ingrassia, Fisher & Lorenz, P.C.

(57) ABSTRACT

A terrestrial cell site handoff list is dynamically maintained for an airborne cellular system. A beam pattern is maintained relative to an airborne cellular system repeater, but rotates relative to the geographic area of coverage. A location and heading of the airplane, locations of respective beams transmitted from the airplane based on airplane flight pattern data, and locations of respective cell sites within a vicinity of footprints of the respective beams transmitted from the airplane are determined. A list of viable handoff terrestrial cell site candidates is then calculated based on the beam pattern, the location and heading of the airplane, the locations of respective beams transmitted from the airplane based on airplane flight pattern data, and the locations of respective cell sites.

18 Claims, 4 Drawing Sheets

U.S. PATENT DOCUMENTS

| | | | |
|---|---|---|---|
| 5,625,867 A | | 4/1997 | Rouffet et al. |
| 5,657,032 A | | 8/1997 | Liechty et al. |
| 5,678,184 A | | 10/1997 | Cutler, Jr. et al. |
| 5,774,790 A | | 6/1998 | Dupuy |
| 5,790,939 A | | 8/1998 | Malcolm et al. |
| 5,832,380 A | | 11/1998 | Ray et al. |
| 5,890,079 A | | 3/1999 | Levine |
| 5,937,349 A | | 8/1999 | Andresen |
| 5,974,349 A | | 10/1999 | Levine |
| 6,006,084 A | | 12/1999 | Miller et al. |
| 6,018,659 A | | 1/2000 | Ayyagari et al. |
| 6,041,235 A | * | 3/2000 | Aalto .......................... 455/437 |
| 6,061,561 A | * | 5/2000 | Alanara et al. .......... 455/456.1 |
| 6,061,562 A | * | 5/2000 | Martin et al. ................ 455/431 |
| 6,072,428 A | | 6/2000 | Schipper et al. |
| 6,073,004 A | | 6/2000 | Balachandran |
| 6,104,926 A | * | 8/2000 | Hogg et al. .................. 455/431 |
| 6,127,946 A | | 10/2000 | Tzidon et al. |
| 6,275,187 B1 | * | 8/2001 | Ross et al. .................. 342/372 |
| 6,285,878 B1 | | 9/2001 | Lai |
| 6,324,398 B1 | | 11/2001 | Lanzerotti et al. |

FOREIGN PATENT DOCUMENTS

| | | | | |
|---|---|---|---|---|
| EP | 0 789 498 | | 8/1997 | |
| EP | 0 803 742 A2 | | 10/1997 | |
| EP | 0 837 567 A2 | | 10/1997 | |
| EP | 0837567 | * | 10/1997 | ........... H04B/7/185 |
| EP | 0 939 569 A1 | | 2/1998 | |
| EP | 0 901 240 A2 | | 3/1999 | |
| FR | 2757331 | | 12/1997 | |
| GB | 2 320 992 A | | 11/1997 | |
| GB | 2318948 A | | 5/1998 | |
| JP | 3104426 A2 | | 5/1991 | |
| WO | WO 95 04407 | | 2/1995 | |
| WO | WO 96 02094 | | 1/1996 | |
| WO | WO9602094 | * | 1/1996 | ........... H04B/7/185 |
| WO | WO 96 16489 | | 5/1996 | |
| WO | WO 97 07609 | | 2/1997 | |
| WO | WO 97 19525 | | 5/1997 | |
| WO | WO 97 23104 A1 | | 6/1997 | |
| WO | WO 98 51568 | | 5/1998 | |
| WO | WO 98 44639 | | 10/1998 | |
| WO | WO 99 13598 | | 3/1999 | |
| WO | WO 99 23769 A1 | | 5/1999 | |
| WO | WO 99 45609 | | 9/1999 | |
| WO | WO 99 46877 | | 9/1999 | |
| WO | WO 00 14902 | | 3/2000 | |
| WO | WO 01 20719 A1 | | 3/2001 | |
| WO | WO 01 20814 A1 | | 3/2001 | |
| WO | WO 01 20815 A1 | | 3/2001 | |
| WO | WO 01 20943 A1 | | 3/2001 | |

OTHER PUBLICATIONS

"Hail HALE, the Answers May All Be Here", Thomas W. Will, Ph.D., Joseph N. Pelton, Ph.D., Unmanned Systems Magazine, Winter 1995, pp. 31–34.

"High–Capacity Aerial Vehicles Aid Wireless Communications", Signal Magazine, Apr. 1997, 6 pages.

"Geosynchronous Satellites at 14 Miles Altitude?", Joseph N. Pelton, Ph.D., New Telecom Quarterly, Second Quarter 1995 (2Q95), pp. 11–16.

"51.84 Mbps Airborne Wireless Experiments: A Prelude to the Emerging HALO ™ Communication Technology", 1999, Jon Aasterud et al.

"Establishing Wireless Communications Services via High–Altitude Aeronautical Platforms: A Concept Whose Time Has Come?" Djuknic et al., IEEE Communications Magazine, Sep. 1, 1997, pp. 128–135.

"On the Use of HALE Platforms as GSM Base Stations", *IEEE Personal Communications,* Apr. 2001, vol. 8, No. 2, pp. 37–43. vol. 8, No. 2, pp. 37–43.

"Relay Aircraft Enable Cell 'Network in the Sky'", William B. Scott, *Aviation Week and Space Technology,* Jun. 29, 1998, pp. 22–23.andS Space Technology, Jun. 29, 1998, pp. 22–23.

"Revised Technical And Operational Parameters For Type 1 IMT–2000 Terrestrial Systems Using High Altitude Platform Stations And CDMA Radio Transmission Technologies", Radiocommunication Study Groups, Mar. 4, 1999.

"Skystation Stratospheric Telecommunication New Payload Description", Mini, Missoni, Pauro, *Proceeding of 17 of the AIAA ICSSC,* 1997, pp. 235–242.

"Wireless Communication Systems using Stratospheric Platforms", Hase, *Technical Report of IEICE,* 2000.

* cited by examiner

METHOD FOR MAINTAINING CANDIDATE HANDOFF LIST FOR AIRBORNE CELLULAR SYSTEM

FIELD OF THE INVENTION

The present invention relates generally to a wireless communications system including an airborne repeater, and particularly to dynamic maintenance of a terrestrial cell site handoff list for an airborne cellular system.

BACKGROUND OF THE INVENTION

The increasing need for wireless networks and communication capabilities in outlying and geographically diverse locations has created greater demand for wireless systems. Many of the new carriers providing the infrastructure for such systems have focused their resources on building as many terrestrial cell stations as possible. As a result, the carriers expand their respective areas of coverage and consequently generate more revenue.

However, the buildout rate for the terrestrial base stations is typically slow and expensive, especially in mountainous areas and sparsely populated areas having few roads and minimal infrastructure buildout. In addition, in some the above-mentioned sparsely populated areas, a carrier's return on investment may not provide the incentive necessary for the carrier to build the necessary cell stations, thereby leaving these areas with either limited service or no wireless service at all. Further, many areas having a sufficient number of wireless communications base stations to handle calls during both off-peak and peak times cannot adequately handle temporarily large volumes of calls during sporting events or other special events that attract large crowds for just a few days.

In response to the above, airborne wireless systems have been proposed in which a wireless repeater mounted in an airplane, flying a predetermined flight pattern over a geographic area requiring wireless coverage, links calls from wireless phones within the covered geographic area to a terrestrial base station and other terrestrial infrastructure components. Because the airplane is capable of traversing geographic limitations and takes the place of the cell stations, such a system overcomes the above-mentioned problems.

Despite its many advantages, an airborne cellular system presents design and implementation considerations not present in the design and implementation of conventional terrestrial cellular systems. One primary consideration relates to maintaining a list of cell station call handoff candidates. Conventional cellular standards and protocols such as TIA/EIA 136, GSM and CDMA IS-95 provide for such handoff candidates. In terrestrial cellular systems, the handoff candidates are controlled in the system switch and are communicated to the handsets for power monitoring. The switch then makes hand-off decisions based on power measurement reports from the handsets. The number of hand-off candidates supported by the protocol is limited and typically does not vary with time. For example, the number of candidates is limited to 24 in the cellular TIA/EIA 136 protocol.

In an airborne cellular system, as the airplane circles in its flight pattern, communications beams radiated from the airplane antenna move relative to the ground thereby causing the system to perform call handoffs as beams rotate into and out of predetermined system areas of coverage. As an airborne cellular system covers a typically broad geographic area, each system beam potentially interacts with a large number of terrestrial cell sites. Therefore, it is likely that the total number of terrestrial cell sites that any given beam interacts with will exceed a number of handoff candidates supported by the given cellular protocol.

In addition, an airborne cellular system provides geographic coverage at the expense of large call capacity. Therefore, if an airborne cellular system were deployed in a predominantly low-density region that has pockets of high density, it would be desirable for a service provider to build terrestrial system cell stations in the high-density pockets and provide service to the remaining low-density areas with an airborne cellular system or systems. However, communications beams from the airborne cellular system would likely overlap with those of the terrestrial system cell stations. As the terrestrial system cell stations would typically have higher power than the communications beams of the airborne cellular system, system users would tend to gravitate to the terrestrial system cell stations in overlapping areas.

Users in areas not covered by terrestrial cell stations initially communicate through the airborne cellular system and can potentially switch over to the terrestrial system, as it may be desirable to hand off user calls from the airborne cellular system to the terrestrial system cell stations to reduce capacity on the airborne cellular system. As there are often hundreds of hundreds of terrestrial system cell stations, the airborne cellular system must generate a corresponding handoff candidate list that includes hundreds of cell station handoff candidates. Unfortunately, such a handoff candidate list is currently beyond the capability of standard cellular protocols and clearly a need exists for solutions to the foregoing problems.

BRIEF DESCRIPTION OF THE DRAWINGS

Advantages of the present invention will be readily apparent from the following detailed description of preferred embodiments thereof when taken together with the accompanying drawings in which.

DETAILED DESCRIPTION OF A PREFERRED EMBODIMENT

Figure 1:
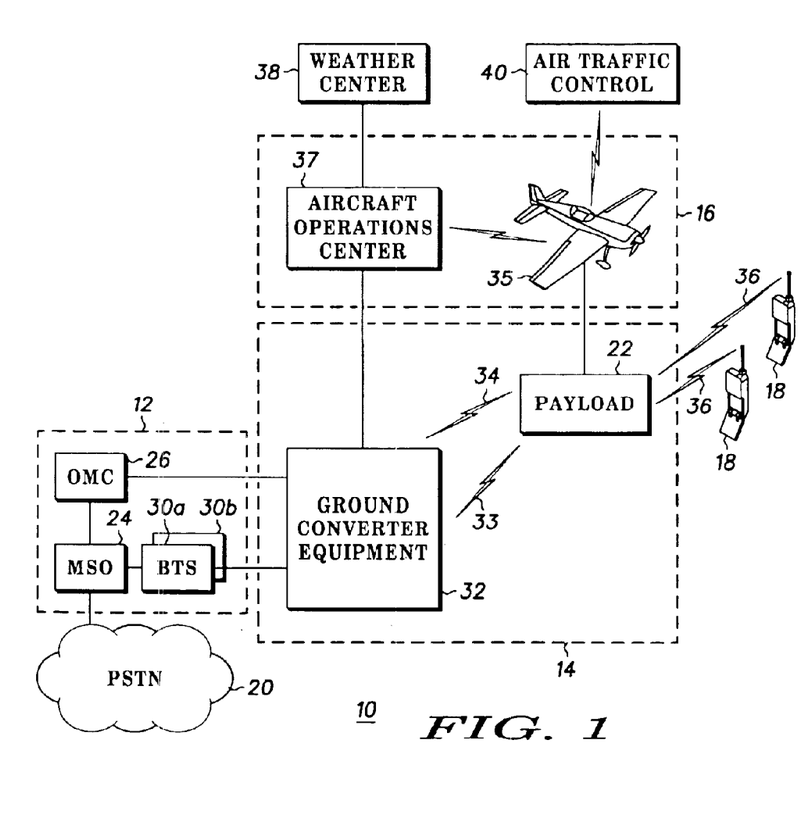
FIG. 1 is a system diagram of an airborne cellular communications according to the present invention.

Referring now to the drawings in which like numerals reference like parts, FIG. 1 shows an airborne cellular communications system 10. The system 10 generally includes three primary segments: a cellular infrastructure segment 12, a radio infrastructure segment 14, and an airplane segment 16. These three segments in combination are capable of providing cellular communications coverage to a large geographical area by enabling system users, represented generally by handsets 18, to link to a public switched telephone network (PSTN) 20 via an airplane payload 22 including a repeater. The structure and function of each of these three system segments will be discussed in detail.

The cellular infrastructure segment 12 includes a mobile switching office (MSO) 24 that includes equipment, such as a telephony switch, voicemail and message service centers, and other conventional components necessary for cellular service. The MSO 24 connects to the PSTN 20 to send and receive telephone calls in a manner well known in the art. In addition, the MSO 24 is connected to an operations and maintenance center (OMC) 26 from which a cellular system operator manages the cellular infrastructure segment 12. The MSO 24 is also connected to one or more base transceiver stations (BTSs) such as the BTSs at 30a, 30b. The BTSs 30a, 30b transmit and receive RF signals from the system users 18 through the radio infrastructure segment 14.

More specifically, the BTS 30 transmits and receives RF signals through ground converter equipment 32. The ground converter equipment 32 converts terrestrial cellular format signals to C-band format signals and communicates with the airborne payload 22 through a feeder link 33 and a telemetry link 34, each of which will be discussed later in detail. The payload 22 establishes a radio link 36 for connecting calls over a wide geographic area of coverage, or footprint, that is capable of exceeding 350 km when the airplane maintains a flight pattern at or around 30,000 feet above the ground.

In addition to the airplane 35, the airplane segment 16 also includes an airplane operations center 37 that controls mission logistics based at least in part on information from sources such as a weather center 38, and manages all system airplanes, as the system preferably includes three airplanes to ensure continuous coverage. The airplane also receives additional routine instructions from sources such as an air traffic control center 40.

Figure 2:
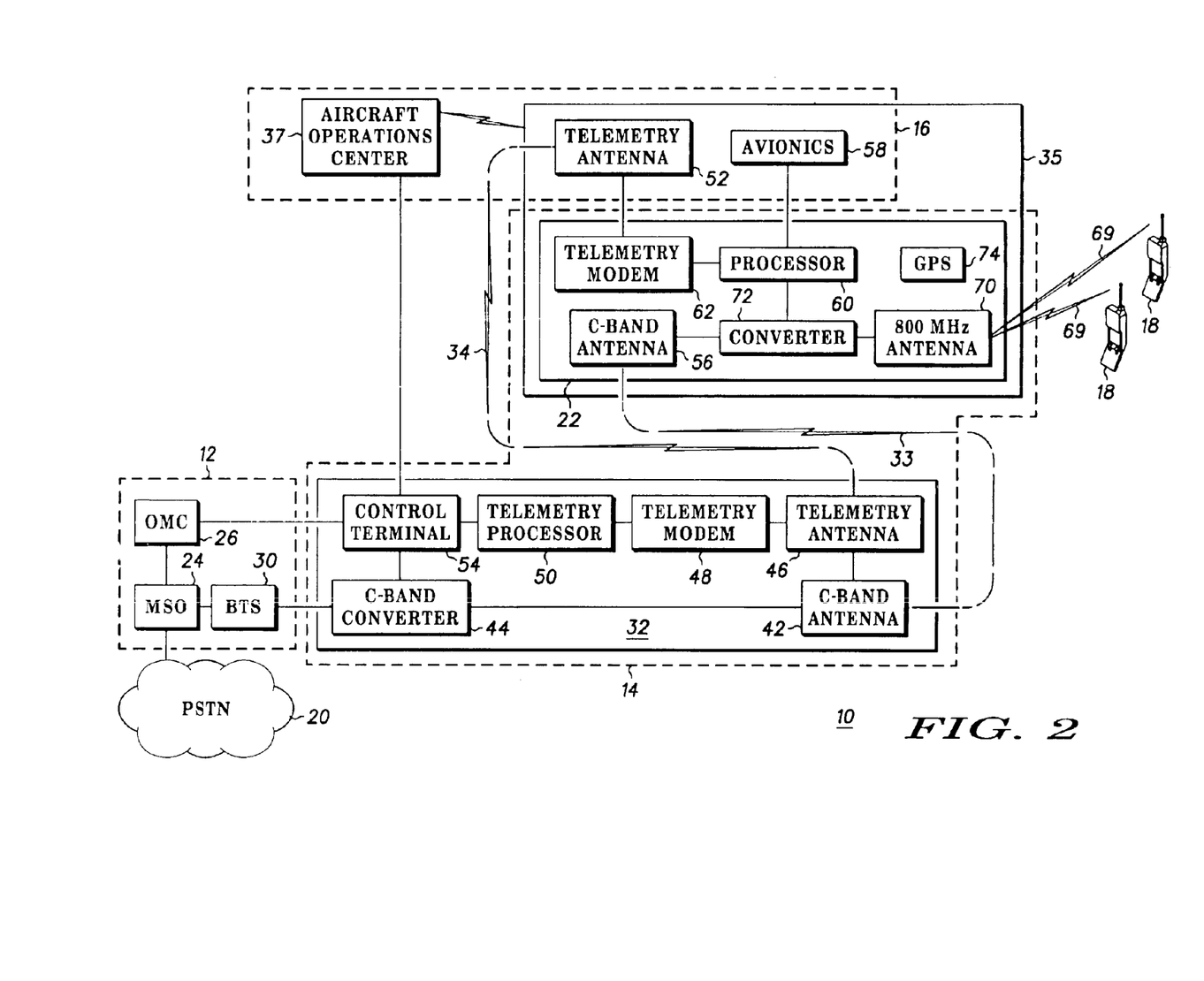
FIG. 2 is a block diagram illustrating the components of the airborne cellular communications system shown in FIG. 1 in more detail.

FIG. 2 shows certain components of the system 10 in more detail. Specifically, the ground converter equipment 32 includes a C-band antenna 42 for receiving/transmitting signals from/to the payload 22 (a second antenna is also provided for redundancy purposes), and a C-band converter 44 for appropriately converting the signals received from or to be transmitted to the payload 22. According to a preferred embodiment, the C-band antenna 42 and the converter 44 enable 800 MHz airborne cellular antennas 70 to communicate with the BTSs 30a, 30b via an established downlink, or feeder link, 33, and the converter 44 upconverts nominal signals from the BTSs 30a, 30b to C-band signals before the signals are transmitted to the airplane 35. Also, each BTS 30a, 30b is assigned a different band in the C-band spectrum so that signals from the different BTSs 30a, 30b can be separated and routed to the correct antenna, such as the antenna 56, at the payload 22. In addition, the ground control equipment 32 includes telemetry components such as a telemetry antenna 46, a telemetry modem 48 and a telemetry processor 50 to receive and process airplane data transmitted from an airplane telemetry antenna 52 over a telemetry link 34, while a control terminal 54 controls transmission of the processed telemetry data to the OMC 26 and the airplane operations center 37.

In the airplane segment 16, the airplane telemetry antenna 52 mentioned above transmits airplane avionics data generated by airplane avionics equipment, represented generally at 58, including airplane location, direction and flight pattern data as well as other data such as airplane pitch, roll and yaw data. The data from the airplane avionics equipment 58 is input into and processed by a payload processor 60 before being output to the telemetry antenna 52 through a telemetry modem 62. The payload processor 60 is also responsible for processing signals transmitted to and received from the ground converter equipment 32 through the feeder link 33 established between the C-band antennas 42, 56 and for processing; signals transmitted to and received from the system users 18 through a downlink, or user link, 69 established between the users 18 and a payload downlink antenna such as an 800 MHz antenna 70, with the signals received by and transmitted from the payload being appropriately upconverted or downconverted by an 800 MHz converter 72. The payload 22, in addition to including the above-mentioned equipment, also includes GPS equipment 74 that can also be input into the processor 60 and transmitted to the ground converter equipment 32 or to the airplane operations center 37 for flight control and/or monitoring purposes. The components shown in the airplane and in the payload together form the airplane repeater that enables cellular coverage to be provided to a large geographic area that may otherwise not support terrestrial cellular coverage due to an insufficient number of cell stations or the like.

As should be appreciated from the system configuration shown in FIGS. 1 and 2, both the airborne cellular system 10 and conventional terrestrial cellular systems appear identical to the PSTN 20 and the system users 18. In other words, there are no discernable service-related differences between calls linked to the PSTN 20 through the cellular infrastructure, radio infrastructure and airplane segments 12–16 and calls handled through a conventional terrestrial system infrastructure, in part due to the fact that the cellular infrastructure segment 12 includes a standard telephony switch in the MSO 24 and BTSs 30a, 30b that are identical or nearly identical to those included in a conventional terrestrial system infrastructure.

Still referring to FIGS. 1 and 2, operation of the components of the airborne cellular system 10 during completion of a call made by one of the system users 18 will now be described. The airplane 35, when on-station preferably flies in a circular or near circular flight pattern (although the flight pattern may vary according to specific weather and coverage conditions) to provide coverage to a predetermined geographic area during a mission. While it is on-station, the airplane maintains contact with the ground converter equipment 32 to provide both the feeder link 33 and the user link 36 for the cellular infrastructure segment 12 through the radio infrastructure equipment segment 14. The airplane 35 also transmits a predetermined number of communications beams, such as, for example, 13 beams, over the coverage area, with each beam being assigned to a sector of one of the BTSs 30a, 30b and having its own set of control and traffic channels to carry signaling and voice data between the system users 18 and the cellular infrastructure segment 12. As the airplane 35 moves in its flight pattern, the beams radiated from the airplane rotate. Therefore, the system users 18 will "see" a different beam every 45 seconds or so and the cellular infrastructure segment 12 performs a sector to sector handoff of the call to keep the call from being dropped.

When initiating a call, a system user, such as one of the users 18, utilizes the control channels in the beam to signal the MSO 24 to request a call setup. The request is sent from a handset of the user 18 to the airplane payload 22, and then is relayed to the ground converter equipment 32. The ground converter equipment 32 relays the request to the corresponding BTS, such as the BTS 30a. The BTS 30a then transmits the request to the MSO 24, which sets up the call with the PSTN 20. The payload 22 therefore simply extends the physical layer of the BTS 30 to the users 18 to allow a much wider area of coverage than would typically be provided by a conventional terrestrial system, and with less associated infrastructure buildout cost. The airborne system 10 is also preferable for providing temporary cellular coverage for special events areas, where coverage is only needed for several days, thereby eliminating the need and cost associated with erecting cell is stations and then tearing the cell stations down after the special events end.

Once the call setup is completed, voice communication with the PSTN 20 through the traffic channels in the beam is initiated, and voice information is then relayed in the same manner as the signaling information. When the call ends, a signal is sent to the MSO 24 to tear down the call, the handset of the user 18 releases the traffic channel used for voice communications, and the channel is returned to an idle state.

Figure 3:
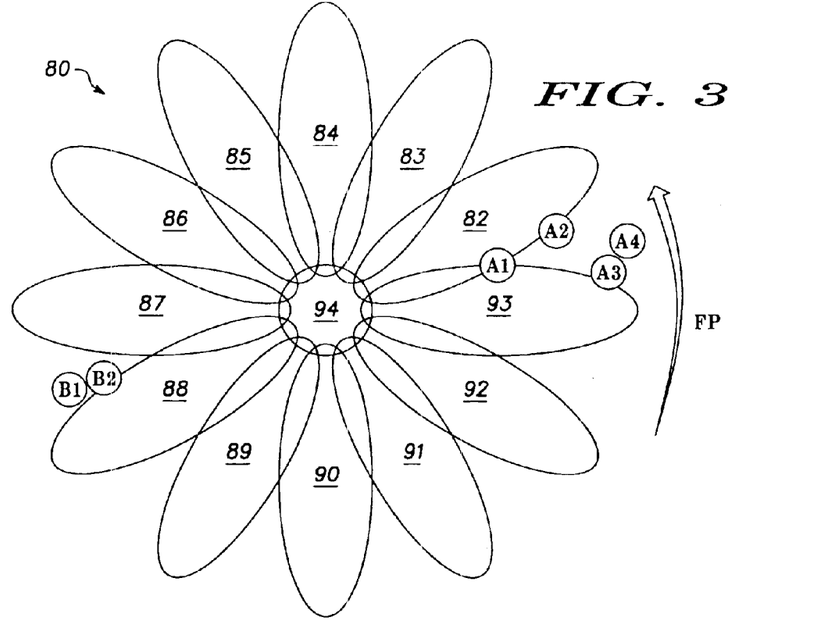
FIG. 3 is a plan view of a beam pattern from an airborne repeater providing cellular coverage to a predetermined geographic area below as well as terrestrial cell stations that are handoff candidates.

FIG. 3 shows an exemplary footprint 80 generated by the airplane segment 16 of the airborne cellular system 10. The footprint is formed from beams 82–94 radiated from the antenna 70, which is preferably a phased-array smart antenna of the type disclosed in U.S. patent application titled SMART ANTENNA FOR AIRBORNE CELLULAR SYSTEM by Ser. No. 10/070,844, filed on Jun. 26, 2000 the contents of which are incorporated herein by reference. Except for the center beam, each of the beams rotates as the airplane 35 executes its flight pattern. Therefore, terrestrial cell stations, such as the cell stations A1–A4 and B1–B2, correspondingly rotate in and out of coverage of the beam footprints of each of the respective beams. In FIG. 3, the flight pattern of the airplane is shown as rotating in a counterclockwise direction as indicated by the flight pattern direction arrow FP. The beams 82–94 correspondingly rotate in the same direction relative to the geographic area of coverage, but remained fixed relative to the airplane 35 as the airplane executes its flight pattern.

Each of the beams, such as the beam 93, therefore sweeps out a large area and potentially overlaps with many terrestrial sites. A static handoff candidate list would require having not only those terrestrial sites currently under the beam, such as sites A1 and A3, and those sites that will soon be under the beam, such as sites A2 and A4, but also sites B1 and B2. Therefore, a system handoff candidate limit, which is typically 24 candidates, may be far exceeded.

To reduce the number of candidates, the beam handoff candidate maintenance technique in accordance with the present invention initially generates the handoff list as a function of beam location. Therefore, the beam 93 would only include sites A1–A4 as handoff candidates and would not include sites B1–B2, while the beam 87 would include sites B1 and B2 as candidates and not sites A1–A4. As the airplane executes its flight pattern, the candidate list for each beam will change so that when the beam 93 covers the terrestrial sites B1–B2, candidates B1–B2 would replace candidates A1–A4.

The beam handoff candidate maintenance technique of the present invention periodically determines a handoff candidate list for each beam based on a dynamically updated handoff list database maintained in the OMC 26. The database contains stored terrestrial cell site locations used, along with airplane position and airplane heading data input to the OMC 26 through the airplane telemetry link 34, to calculate the cell site candidate handoff list. The OMC 26 can generate a handoff candidate list including only a predetermined number of highest probability/priority candidates and can update/modify the list as a function of time. For example, in an airborne cellular system in which TIA/EIA 136 protocol is utilized, only the top 24 handoff candidates based on handoff priority would be included in a handoff list for each beam.

For example, referring still to FIG. 3, a user being serviced by the beam 93 would have beams 92, 94, at a minimum, as time sensitive handoff candidates. As the airplane 35 executes its flight pattern, the payload 22 will continuously monitor beams 92, 94 as handoff candidates. The payload 22 will also have terrestrial cells A1–A4 as time insensitive candidates. These time insensitive candidates are periodically evaluated to facilitate handoffs between the airplane 35 and the terrestrial system to alleviate capacity constraints on the system 10. These handoff candidates are time insensitive, as a delay in the handoffs between the airplane 35 and the terrestrial system will impact only the potential capacity of the beam 93 and will not impact call performance. As a result, the hand-off candidate list at any given time will include several time sensitive handoff candidates that continuously occupy slots within the handoff candidate list, and time insensitive hand-off candidates that only periodically occupy slots within the handoff candidate list.

Figure 4:
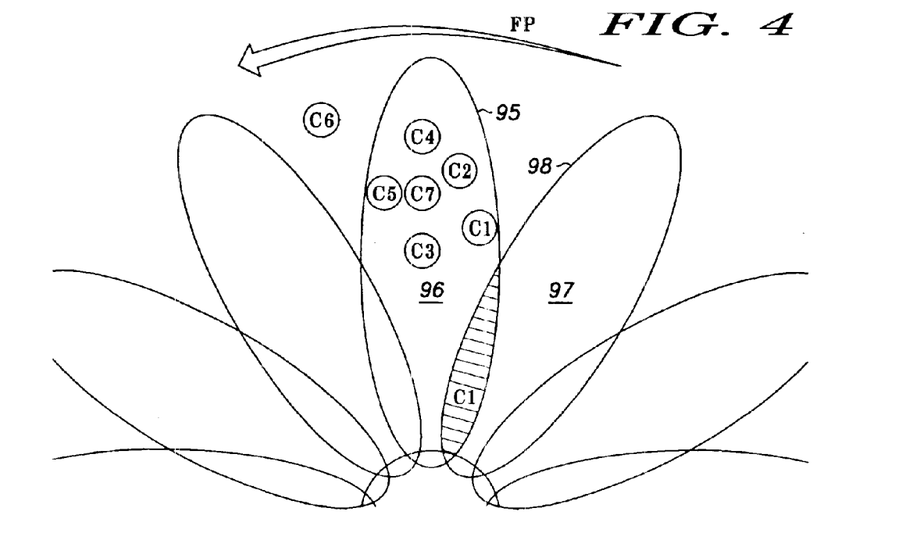
FIG. 4 is a plan view of a single beam such as one of the beams in the beam pattern in FIG. 3 showing terrestrial cell stations within the beam pattern that are hand-off is, candidates.

Referring now to FIG. 4, prioritization of handoff candidates to determine how frequently the candidates are included in the cyclically generated handoff candidate list associated with a communications beam in accordance with the present invention will now be discussed. Such prioritization is necessary due to the potentially large number of time insensitive handoff candidates and the small number of handoff candidate list slots, and is based on the probability of a given terrestrial cell being the best handoff cell for a user. In a preferred embodiment, the prioritization is based on the subscriber density associated with a cell. High-density cells will most likely receive the most handoffs, and therefore are ranked as higher priority candidates than low-density cells. High priority candidates would therefore be cycled into the time insensitive handoff candidate list slots more frequently than the low priority candidates.

As shown in FIG. 4, a subscriber, for example, at location C1 in a cell 96 formed by a beam 95 would have a cell 97 formed by a beam 98 as a time sensitive handoff candidate that would continuously occupy a handoff candidate list slot. Terrestrial cells C2–C5, which are located at the outskirts of coverage for an urban area with high user density, would also be high priority candidates. Therefore, C1–C6 would be frequently cycled through the handoff candidate list. Cell C6, which provides coverage for a small rural town with a low user density, and cell C7, which is in the middle of the defined urban coverage area, would be defined as low priority candidates and therefore would be cycled through less frequently on the handoff candidate list. More specifically, cell C7 would be considered a low priority candidate, as a user call would be linked directly through the cell C7 to the corresponding terrestrial system rather than through the system 10 if the user were in close proximity to the cell C7.

The handoff candidate list database which is preferably maintained in the OMC 26 is therefore dynamically updated by the above-described preferred embodiment in accordance with the present invention based on airplane location, the distinction between time sensitive and time insensitive hand-off candidates, and the prioritization of time insensitive hand-off candidates based on subscriber density. Alternative embodiments could prioritize time insensitive candidates based on factors other than subscriber density in accordance with system-specific parameters. Also, a relative ranking of all handoff candidates can be established based on the relative densities associated with each of the handoff candidate cells and based on the relative need for a user to be handed off from one beam to another in the system 10 to further prioritize the high and low priority handoff candidates.

If an excessive number of candidates exist after the high priority list is generated, the technique of the present invention can further reduce the number of candidates by periodically cycling through those handoff cell candidates within the footprint of the beam that are not time-sensitive. In other words, ground-based cell sites, which are not time-sensitive, may be divided into multiple groups within the beam to provide the technique in accordance with the present invention with a higher-ranking resolution. The handoff list maintenance technique may then cycle through only these groups of non-time sensitive cells more regularly to provide a more precise update of the handoff list without affecting hand offs of time-sensitive cells, such as the cell C1 in FIG. 3. Even though an associated handoff delay of, for example, 15 seconds or so would be associated with cycling through the multiple groups of non-time-sensitive cells, such a delay is acceptable.

Figure 5:
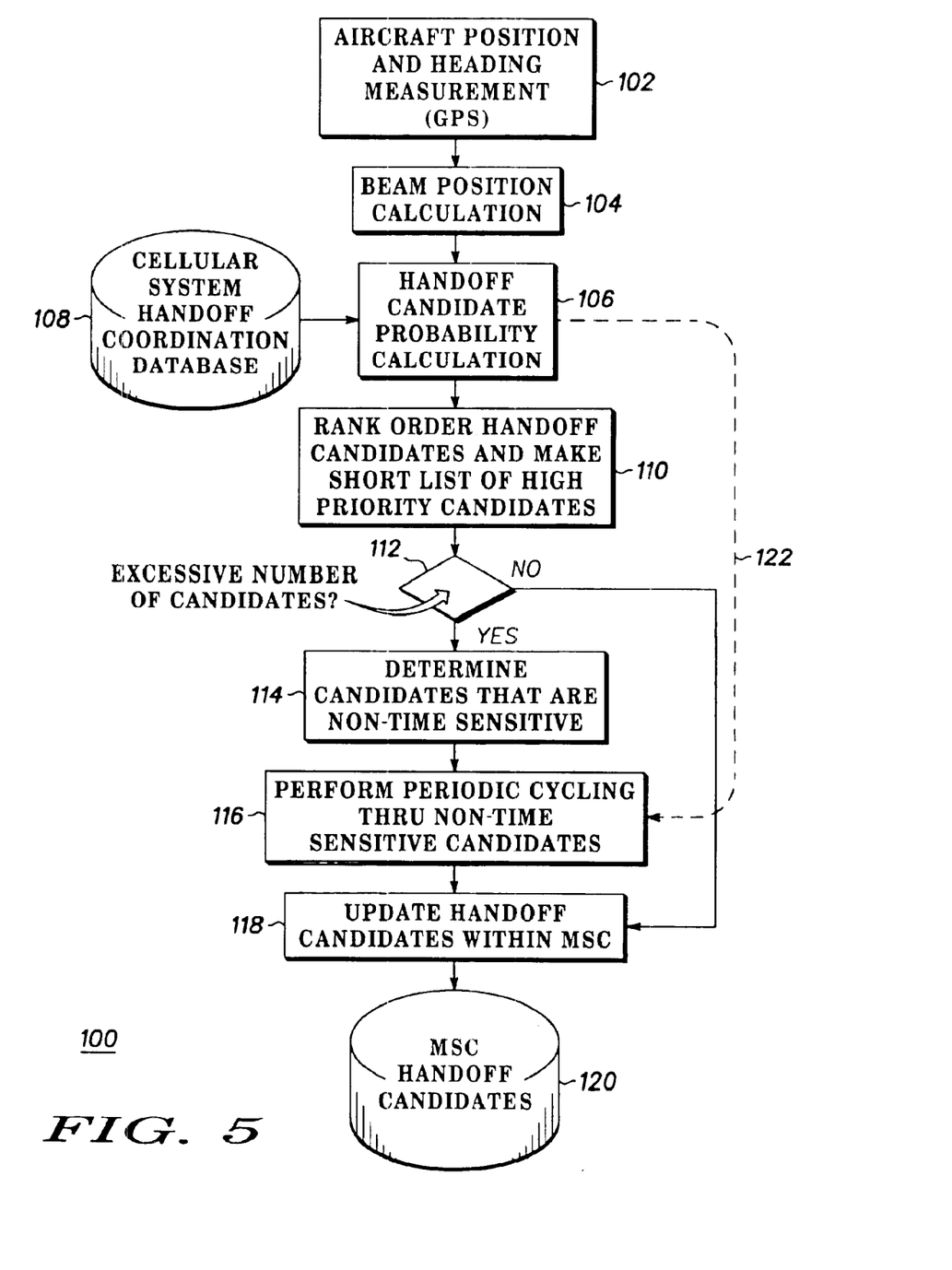
FIG. 5 is a flow diagram of the handoff candidate list methodology in accordance with a preferred embodiment of the present invention.

FIG. 5 is a flow diagram illustrating the methodology of the candidate handoff list maintenance technique of the present invention generally at 100. The process at 102 initially determines airplane position and heading via GPS data provided from the airplane 35 through the telemetry link 34, as well as beam position data for each communications beam at 104. At 106, handoff candidate probability calculations are performed as discussed above and based in part on terrestrial cell site location data stored in the cellular system handoff coordination database at 108. After the above calculations are made, at 110 handoff candidates are ranked and high priority candidates are identified. At 112, it is determined whether an excessive number of candidates exist within a particular beam. If an excessive number of candidates do exist, the above-described determination of non-time sensitive candidates may be performed at 114, and the time insensitive candidates are subsequently periodically cycled through at 116. At 118, the handoff candidate list is then updated after the time insensitive handoff candidates are cycled through to generate the handoff candidate list at 120.

If at 112 an excessive number of candidates is determined not to exist, the hand-off candidate list is updated at 118 to produce the handoff candidate list at 120 without determining and cycling through time insensitive candidates at 114 and 116, respectively. Also, as indicated by the dashed line at 122, the ranking operation at 110 and the excessive candidate determination at 112 may be skipped, and the technique may proceed directly from performing a handoff candidate probability calculation at 106 to performing periodic cycling through time insensitive candidates at 116.

In addition to facilitating handoffs from an airborne cellular system to terrestrial system cell sites, it is also contemplated that the candidate handoff list maintenance technique of the present invention may be designed to facilitate handoffs in a manner opposite to that described above, or, in other words, to enable handoffs from a terrestrial system to an adjacent airborne communications system. In such a case, terrestrial cells bordering on or overlapping the airborne system coverage area would also require a time-varying handoff candidate list as well. The list would function in a manner similar to the list described above, except that the communications beams, rather than the terrestrial cells, would be the handoff candidates. As there would be usually only one or two beams over a terrestrial cell at one time, however, a cyclical approach would not be required.

As should now be appreciated from the foregoing discussion, the candidate beam hand-off list maintenance technique of the present invention facilitates terrestrial system interoperability with an airborne cellular system by enabling reliable handoffs to be made between wide area coverage airborne cellular systems and terrestrial systems for overlay applications. The present invention also facilitates reliable handoffs between adjacent airborne cellular systems, and is capable of distinguishing between time-sensitive and non-time sensitive handoff candidates based on such factors as terrestrial cell user densities.

While the above description is of the preferred embodiment of the present invention, it should be appreciated that the invention may be modified, altered, or varied without deviating from the scope and fair meaning of the following claims.

What is claimed is:

1. A method of maintaining a terrestrial cell site handoff list for an airborne cellular system comprising the steps of:

maintaining a fixed beam pattern of one or more communications beams transmitted from an airplane relative to terrestrial cellular system users, each of the one or more communication beams supporting cellular communications for terrestrial cellular system users, all of the one or more beans covering a footprint on the ground;

determining a location and beading of the airplane;

determining locations of each of the one or more communication beams transmitted from the airplane based on airplane flight pattern data;

determining locations of respective terrestrial cell sites within a vicinity of the footprints of each of the one or more beams transmitted from the airplane;

calculating list of viable handoff nal cell site candidates for handoffs of a terrestrial mobile user between one or more communication beams and terrestrial cell sites based on maintaining a fixed communication beam pattern, the location and heading of the airplane, the locations of each of the one or more communication beams transmitted from the airplane based on airplane flight pattern data, and the locations of respective cell sites; and wherein the step of calculating a list of viable handoff terrestrial cell site candidates comprises mapping data generated from the steps of maintaining a fixed communication beam pattern, determining a location and heading of the airplane, determining locations of each of the one or more communication beams transmitted from the airplane based on airplane flight pattern data, and determining locations of respective cell sites to a cell site location database to determine the viable handoff terrestrial cell site candidates.

2. The method of claim 1, wherein the determining of a location and heading of the airplane comprises receiving a fight pattern location of the airplane via a telemetry link.

3. The method of claim 1, further comprising ranking each of the viable hand-off terrestrial cell site candidates based on associated probability data found during the calculating of a list of viable handoff terrestrial cell site candidates.

4. The method of claim 3, wherein a number of the viable handoff terrestrial cell site candidates found during the calculating of a list of viable handoff terrestrial cell site candidates is protocol-pendent.

5. The method of claim 1, wherein the calculating of a list of viable handoff terrestrial cell site candidates for handoffs of a terrestrial mobile user between one or more communication beams and terrestrial cell sites is performed for each of the one or more communication be transmitted from the airplane.

6. The method of claim 5, further comprising dividing up the list of viable handoff terrestrial cell site candidates into multiple candidate groups according to candidate geographic locations within each of the one or more communication beans transmitted from the airplane; and cycling through the multiple candidate groups to further educe the list of viable hand-off terrestrial candidates based on the multiple candidate groups.

7. The method of claim 1, further comprising updating the list of viable handoff terrestrial cell site candidates as a function of time as the airplane flight pattern data changes.

8. The method of claim 1, wherein the calculating of a list of viable handoff terrestrial cell site candidates is performed to compensate for airplane flight pattern changes caused by adverse weather conditions.

9. The method of claim 1, further comprising calculating viable airplane beams for receiving handoffs from terrestrial cell sites; and creating an airplane beam handoff list based on the calculating of viable airplane beams.

10. The method of claim 1, further comprising dividing the list of viable handoff terrestrial cell site candidates into time-sensitive candidates and non-time-sensitive handoff candidates.

11. A method of maintaining a terrestrial cell site handoff list for an airborne cellular system comprising the steps of:

maintaining a fixed beam pattern of one or more communications beams transmitted from an airplane relative to terrestrial cellular system users, each of the one or more communication beams supporting cellular communications for terrestrial cellular system users, all of the one or more beams covering a footprint on the ground;

determining a location and heading of the airplane;

determining locations of each of the one or more communication beams transmitted from the airplane based on airplane flight pattern data;

determining locations of respective terrestrial cell sites within a vicinity of the footprints of each of the one or more beams transmitted from the airplane;

calculating a list of viable of terrestrial cell site candidates for handoffs of a terrestrial mobile user between one or more communication beams and terrestrial cell sites based on maintaining a fixed communication beam pattern, the location and heading of the airplane, the locations of each of the one or more communication beams transmitted from the airplane based on airplane flight patter data, and the locations of respective cell sites, the calculation performed for each of tee one or more communication beams transmitted from the airplane;

dividing up the list of viable handoff terrestrial cell site candidates into multiple candidate groups according to candidate geographic locations within each of the one or more communication beams transmitted from the airplane; and cycling through the multiple candidate groups to further reduce the list of viable hand-off terrestrial candidates based on the multiple candidate groups.

12. The method of claim 11, wherein the determining of a location and heading of the airplane comprises receiving a flight pattern location of the airplane via a telemetry links.

13. The method of claim 11, wherein the step of calculating a list of viable hand-off terrestrial cell site candidates comprises mapping data generated from the steps of maintaining a fixed communication beam pattern, determining a location and heading of the airplane, determining locations of each of the one or more communication beams transmitted from the airplane based on airplane flight pattern data, and determining locations of respective cell sites to a cell site location database to determine the viable handoff terrestrial cell site candidates.

14. The method of claim 11, further comprising ranking each of the viable handoff terrestrial cell site candidates based on associated probability data found during the calculating of a list of viable handoff terrestrial cell site candidates.

15. The method of claim 14, wherein a number of the viable handoff terrestrial cell site candidates found during the calculating of a list of viable handoff terrestrial cell site candidates is protocol dependent.

16. The method of claim 11, further comprising updating the list of viable hand-off terrestrial cell site candidates as a function of time as the airplane flight pattern data changes.

17. The method of claim 11, wherein the calculating of a list of viable hand-off terrestrial cell site candidates is performed to compensate for airplane flight patty changes caused by adverse weather conditions.

18. The method of claim 11, further comprising calculating viable airplane beams for receiving handoffs from terrestrial cell sites; and creating an airplane beam handoff list based on the calculating of viable airplane beams.

* * * * *

UNITED STATES PATENT AND TRADEMARK OFFICE
CERTIFICATE OF CORRECTION

PATENT NO. : 6,856,803 B1  Page 1 of 1
DATED : February 15, 2005
INVENTOR(S) : Jonathan H. Gross et al.

It is certified that error appears in the above-identified patent and that said Letters Patent is hereby corrected as shown below:

Column 8,
Line 40, delete "nal" and insert -- terrestrial -- therefor.

Column 10,
Line 6, delete "tee" and insert -- the -- therefore.

Signed and Sealed this

Seventeenth Day of May, 2005

JON W. DUDAS
*Director of the United States Patent and Trademark Office*